US006594267B1

(12) United States Patent
Dempo

(10) Patent No.: US 6,594,267 B1
(45) Date of Patent: Jul. 15, 2003

(54) AAL2 PACKET EXCHANGE DEVICE

(75) Inventor: Hiroshi Dempo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/323,123

(22) Filed: Jun. 1, 1999

(30) Foreign Application Priority Data

Jun. 2, 1998 (JP) .......................... 10-153251

(51) Int. Cl.[7] .......................... H04L 12/28; H04L 12/56
(52) U.S. Cl. .............................. 370/395.64; 370/395.6; 370/395.1
(58) Field of Search ........................ 370/310.1, 395.6, 370/395.64

(56) References Cited

U.S. PATENT DOCUMENTS

| 5,940,385 | A | * | 8/1999 | Mita et al. .................. 370/349 |
| 5,953,339 | A | * | 9/1999 | Baldwin et al. ............ 370/397 |
| 6,038,231 | A | * | 3/2000 | Dolby et al. ................ 370/394 |
| 6,049,530 | A | * | 4/2000 | Petersen et al. ............ 370/248 |
| 6,266,343 | B1 | * | 7/2001 | Caves ........................ 370/466 |
| 6,289,016 | B1 | * | 9/2001 | Subbiah et al. ............. 370/395 |
| 6,449,276 | B1 | * | 9/2002 | Subbiah et al. .......... 370/395.6 |

FOREIGN PATENT DOCUMENTS

| CA | 2232320 | 10/1998 |
| JP | 10-294743 | 11/1998 |
| WO | 96/26589 | 8/1996 |

* cited by examiner

*Primary Examiner*—Huy D. Vu
*Assistant Examiner*—Michael J Molinari
(74) *Attorney, Agent, or Firm*—Sughrue Mion, PLLC

(57) ABSTRACT

An AAL2 packet exchange device is placed in front of an ATM switch for executing CPS packet re-multiplexing into ATM cells. The AAL2 packet exchange device extracts CPS-PDUs (Common Part Sublayer-Protocol Data Units) from ATM cells which are supplied from input ATM lines, extracts CPS packets from the CPS-PDUs, alters CIDs (Channel IDentifiers) of the CPS packets if necessary so that CID collision will not occur between CPS packets supplied from different sources to be outputted to the same output ATM connection, multiplexes the CPS packets to be outputted to the same output ATM connection in ATM cells of the same output ATM connection. The CID alteration is executed by referring to a path setting table which stores each correspondence between a first internal address for discriminating between input ATM connections, an input CID, a second internal address for discriminating between output ATM connections, and an output CID. By the CID alteration, CPS packets which have been contained in ATM cells from different sources can be multiplexed onto the same VP/VC.

9 Claims, 10 Drawing Sheets

FIG. 2
PRIOR ART (ATM CELL HEADER SEARCH TABLE 5)

| CID | VPI/VCI | ATM CELL HEADER INFORMATION |
|---|---|---|
| A | AA | X |
| B | AA | X |
| C | AB | Y |
| D | AC | Z |
| ⋮ | ⋮ | ⋮ |

CID COLLISION

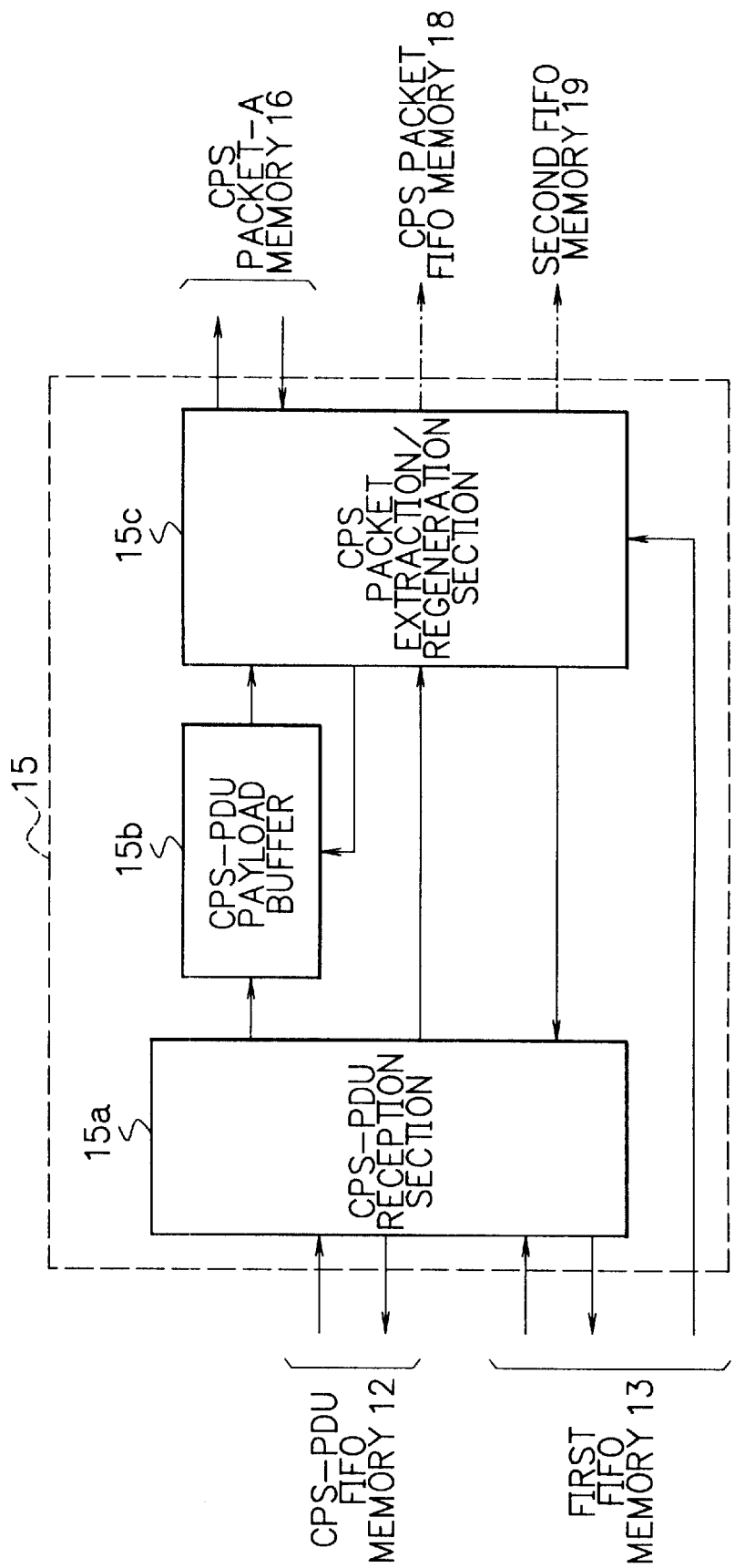
F I G. 7

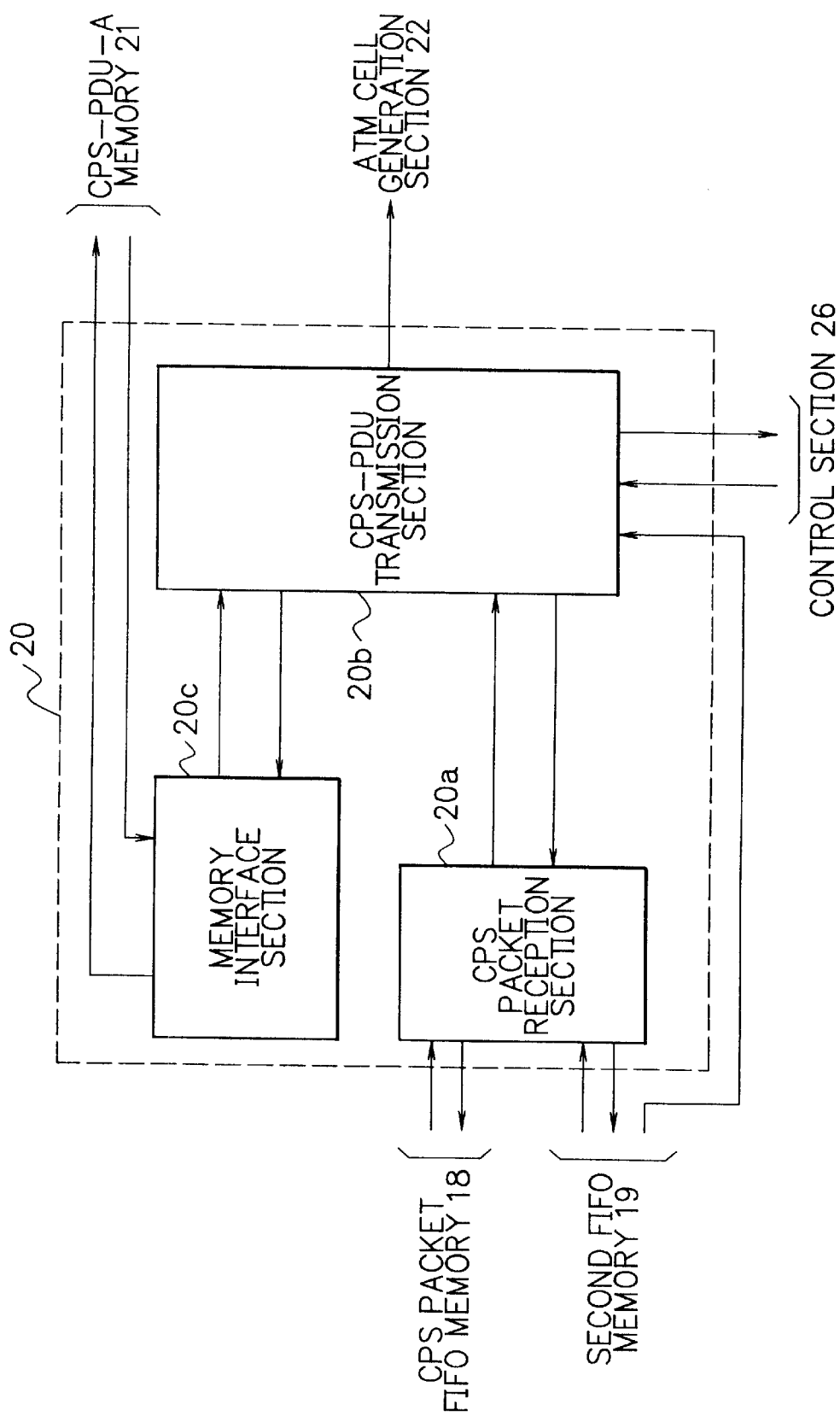

AAL2 PACKET EXCHANGE DEVICE

BACKGROUND OF THE INVENTION

The present invention relates to an AAL2 packet exchange device for executing interchanging of CPS packets (AAL2 packets according to ATM adaptation layer 2) extracted from input ATM cells and thereby remultiplexing the CPS packets in output ATM cells.

DESCRIPTION OF THE PRIOR ART

As an ATM (Asynchronous Transfer Mode) adaptation layer for ATM signal transfer, there has been standardized the AAL2 (ATM Adaptation Layer type 2 (ITU-T I.363.2)). According to the AAL2, the payload (48-byte information field) of an ATM cell is used for carrying a CPS-PDU (Common Part Sublayer-Protocol Data Unit) (48 bytes). The 48-byte CPS-PDU is composed of a CPS-PDU header (1 byte) and a CPS-PDU payload (47 bytes), and CPS (Common Part Sublayer) packets are filled (multiplexed) in the CPS-PDU payload. The CPS packet is a variable length packet whose maximum length is 48 bytes (or 64 bytes (option)), which is composed of a CPS packet header (3 bytes) and a CPS packet payload (45 bytes or less). In the CPS packet header, a CID (Channel IDentifier) (1 byte) which is used for designating the logical channel of each CPS packet is included. At an ATM switch for executing ATM cell transfer according to the AAL2, CPS packets are extracted from two or more CPS-PDUs (i.e. from two or more ATM cells), and the extracted CPS packets are re-multiplexed in one or more CPS-PDUs, and the CPS-PDU is filled in a new ATM cell and transmitted (see Japanese Patent Application Laid-Open No.HEI 10-294743 and International Publication No. WO96/26589, for example).

FIG. 1 is a schematic block diagram showing an example of a conventional AAL2 packet exchange device. FIG. 2 is a table showing information which is stored in an ATM cell header search table 5 which is shown in FIG. 1. FIG. 3 is a schematic diagram showing variable length packet interchange operation which is executed by a variable length packet interchange device 1 (i.e. the AAL2 packet exchange device) which is shown in FIG. 1.

Referring to FIG. 1, a variable length packet interchange device 1 (i.e. the AAL2 packet exchange device) is placed in front of an ATM switch 6. The variable length packet interchange device 1 includes a variable length packet extraction section 2 and a variable length packet re-multiplexing section 3. The variable length packet extraction section 2 extracts variable length packets (CPS packets) from inputted ATM cells. The variable length packet re-multiplexing section 3 extracts channel identifiers (CIDs) from headers of the CPS packets. A CPU 4 searches the ATM cell header search table 5 of FIG. 2 using the CID (packet address) of each CPS packet, and thereby obtains a VPI/VCI and ATM cell header information concerning each of the CPS packets. Thereby, CPS packets corresponding to the same VPI/VCI (in the ATM cell header search table 5) is gathered in each buffer of the variable length packet re-multiplexing section 3, and the CPS packets corresponding to the same VPI/VCI is multiplexed by the variable length packet re-multiplexing section 3 in an ATM cell having the VPI/VCI. By such operation, the CPS packets A, B, C, D and E shown in FIG. 1 are re-multiplexed in the ATM cells 7a, 7b and 7c shown in FIG. 1 respectively to be outputted to the output lines.

However, the conventional AAL2 packet exchange device involves the following drawbacks or problems.

When CPS packets (variable length packets) are extracted from a plurality of ATM cells and the extracted CPS packets are re-multiplexed in ATM cells according to the VPI/VCI (obtained from the ATM cell header search table 5), the CIDs in the re-multiplexed CPS packets are not altered, therefore, CID collision can occur in an ATM cell to be outputted. For example, referring to FIG. 3, two ATM cells are supplied to the variable length packet interchange device 1. The first ATM cell contains 4 CPS packets whose CIDs are "A", "B", "C" and "D", and the second ATM cell contains 4 CPS packets whose CIDs are "E", "F", "C" and "G". The 8 CPS packets are extracted from the two ATM cells, and re-multiplexed in two ATM cells (for example) according to the VPI/VCIs searched from the ATM cell header search table 5 using the CIDs of each CPS packet. As a result, CID collision occurs in the second output ATM cell (i.e. in the second ATM cell to be outputted), that is, two CPS packets having the same CIDs "C" are multiplexed in one ATM cell. Referring to the two input ATM cells on the upper side of FIG. 3, it can be judged that the two CPS packets having the same CIDs "C" have supplied from different sources if the VPI/VCI of the first input ATM cell differs from that of the second input ATM cell. However, when the second output ATM cell containing the two CPS packets having CIDs "C" is outputted and supplied to the next ATM switch etc, it can not be judged that the two CPS packets having CIDs "C" have supplied from different sources, since the two CPS packets have the same CIDs "C" and are contained in an ATM cell having a VPI/VCI.

In order to avoid this problem, the two CPS packets having the same CIDs "C" have to be multiplexed in different ATM cells having different VPI/VCIs. As a result, usage efficiency of each VP/VC has to be decreased. Further, the number of ATM cells generated and outputted by the AAL2 packet exchange device is necessitated to be increased in order to avoid the CID collision, and thus the load on the next ATM switches is necessitated to be increased.

SUMMARY OF THE INVENTION

It is therefore the primary object of the present invention to provide an AAL2 packet exchange device by which multiplexing efficiency on each ATM connection can be increased, and thereby increase in the number of ATM cells and increase in the load on ATM switches can be avoided.

In accordance with a first aspect of the present invention, there is provided an AAL2 packet exchange device which is placed in front of an ATM switch for executing CPS packet re-multiplexing into ATM cells. The AAL2 packet exchange device extracts CPS-PDUs (Common Part Sublayer- Protocol Data Units) from ATM cells which are supplied from input ATM lines, extracts CPS packets from the CPS-PDUs, alters CIDs (Channel IDentifiers) of the CPS packets if necessary so that CID collision will not occur between CPS packets supplied from different sources to be outputted to the same output ATM connection, multiplexes the CPS packets to be outputted to the same output ATM connection in ATM cells of the same output ATM connection, and thereby realizes re-multiplexing of CPS packets extracted from ATM cells supplied from different sources into the same ATM connection without the CID collision.

In accordance with a second aspect of the present invention, in the first aspect, the AAL2 packet exchange device comprises a selector means, a path setting table means, a first memory means, a CPS-PDU processing means, a CPS packet processing means, a second memory means, a CPS-PDU generation means, an ATM cell generation means and a multiplexing means. The selector means selects ATM cells containing CPS-PDUs and ATM cells not containing CPS-PDUs from ATM cells supplied from the input ATM lines, outputs the ATM cells not containing CPS-PDUs untouched, and extracts the CPS-PDUs from the ATM cells containing CPS-PDUs. The path setting table means stores a table indicating each correspondence between a first internal address for discriminating between input ATM connections, an input CID, a second internal address for discriminating between output ATM connections, and an output CID. The first memory means stores the CPS-PDUs extracted by the selector means and the first internal addresses concerning the CPS-PDUs. The CPS-PDU processing means extracts CPS packets from the CPS-PDU which has been stored in the first memory means, stores the front part of a CPS packet if the CPS packet has been split across two CPS-PDUs, and regenerates the CPS packet when the rear part of the CPS packet is supplied, by adding the rear part to the front part of the CPS packet which has been stored therein. The CPS packet processing means obtains the second internal address and the output CID concerning each CPS packet extracted or regenerated by the CPS-PDU processing means by referring to the path setting table means using the first internal address and the CID (input CID) concerning the CPS packet, updates the CID (input CID) of each CPS packet into the output CID, updates HEC (Header Error Control) information of the CPS packet, and outputs the CPS packet and the second internal address concerning the CPS packet. The second memory means stores the CPS packets and the second internal addresses concerning the CPS packets outputted by the CPS packet processing means. The CPS-PDU generation means reads out the CPS packets and the second internal addresses concerning the CPS packets from the second memory means, multiplexes CPS packets corresponding to the same second internal address into a CPS-PDU, and outputs the CPS-PDU. The ATM cell generation means fills the CPS-PDU supplied from the CPS-PDU generation means in an ATM cell and outputs the ATM cell to one of its output lines according to information obtained from the path setting table means, and meanwhile outputs an idle ATM cell to each output line that has no ATM cell to be outputted thereto. The multiplexing means multiplexes the ATM cells not containing CPS-PDUs outputted by the selector means and the ATM cells outputted by the ATM cell generation means, and outputs the multiplexed ATM cells to its output lines.

In accordance with a third aspect of the present invention, in the second aspect, the AAL2 packet exchange device further comprises a CPS-PDU output request means. The CPS-PDU output request means sends a CPS-PDU output request signal and a second internal address to the CPS-PDU generation means if the CPS-PDU generation means has not outputted a CPS-PDU corresponding to the second internal address for a predetermined period, and thereby makes the CPS-PDU generation means output a CPS-PDU corresponding to the second internal address to the ATM cell generation means immediately.

In accordance with a fourth aspect of the present invention, in the second aspect, the first memory means includes a CPS-PDU FIFO (First In First Out) memory and a first internal address FIFO memory. The CPS-PDU FIFO memory stores the CPS-PDUs supplied from the selector means according to FIFO operation, and the first internal address FIFO memory stores the first internal addresses concerning the CPS-PDUs according to FIFO operation.

In accordance with a fifth aspect of the present invention, in the second aspect, the second memory means includes a CPS packet FIFO (First In First Out) memory and a second internal address FIFO memory. The CPS packet FIFO memory stores the CPS packets outputted by the CPS packet processing means, and the second internal address FIFO memory stores the second internal addresses concerning the CPS packets according to FIFO operation.

In accordance with a sixth aspect of the present invention, in the second aspect, the CPS-PDU processing means includes a CPS packet front part memory. The CPS packet front part memory stores the front part of the CPS packet which has been split across two CPS-PDUs, with respect to each first internal address.

In accordance with a seventh aspect of the present invention, in the second aspect, the CPS-PDU generation means includes a CPS-PDU front part memory. The CPS-PDU front part memory stores the CPS-PDU in the middle of generation, with respect to each second internal address.

In accordance with an eighth aspect of the present invention, in the second aspect, the selector means includes internal buffers, buffer control sections, a selector section, a CPS-PDU transmission section and an ATM cell transmission section. Each of the internal buffers is provided corresponding to each of the input ATM lines for storing the ATM cell supplied from the input ATM line. The buffer control sections control reading/writing of the ATM cells to the internal buffers. The selector section executes ATM cell transmission request to each buffer control section, receives the ATM cell from the buffer control section, extracts the VPI (Virtual Path Identifier) and the VCI (Virtual Channel Identifier) from the ATM cell, obtains the first internal address concerning the ATM cell from the path setting table means using the VPI, the VCI and the input line number concerning the ATM cell, sends the ATM cell and the first internal address concerning the ATM cell to the CPS-PDU transmission section if the ATM cell contains a CPS-PDU, and sends the ATM cell and the input line number concerning the ATM cell to the ATM cell transmission section if the ATM cell does not contain a CPS-PDU. The CPS-PDU transmission section receives the ATM cell containing the CPS-PDU and the first internal address from the selector section, extracts the CPS-PDU from the ATM cell, and outputs the CPS-PDU and the first internal address to the first memory means. The ATM cell transmission section receives the ATM cell not containing a CPS-PDU and the input line number concerning the ATM cell from the selector section, and outputs the ATM cell to the multiplexing means via one of its output lines corresponding to the input line number.

In accordance with a ninth aspect of the present invention, in the second aspect, the CPS-PDU processing means includes a CPS packet front part memory, a CPS-PDU reception section, a CPS-PDU payload buffer and a CPS packet extraction/regeneration section. The CPS packet front part memory stores the front part of a CPS packet which has been split across two CPS-PDUs, with respect to each first internal address. The CPS-PDU reception section reads out the CPS-PDU and the first internal address concerning the CPS-PDU from the first memory means, extracts a CPS-PDU header and CPS-PDU payload information from the CPS-PDU, outputs the CPS-PDU header and the first internal address to the CPS packet extraction/regeneration section, and writes the CPS-PDU payload information in the CPS-PDU payload buffer. The CPS-PDU payload buffer stores the CPS-PDU payload information. The CPS packet extraction/regeneration section executes a CPS packet extraction/regeneration process with regard to the CPS-PDU using the CPS-PDU payload information stored in the CPS-PDU payload buffer, the CPS-PDU header and the first internal address supplied from the CPS-PDU reception section, and the front part of a CPS packet which has been stored in the CPS packet front part memory, and outputs the extracted/regenerated CPS packets, the first internal address concerning the CPS packets, and the CIDs of the CPS packets to the CPS packet processing means.

In accordance with a tenth aspect of the present invention, in the second aspect, the CPS-PDU generation means includes a CPS packet reception section, a CPS-PDU front part memory and a CPS-PDU transmission section. The CPS packet reception section reads out the CPS packet and the second internal address concerning the CPS packet from the second memory means and outputs them when a CPS packet request signal is supplied thereto. The CPS-PDU front part memory stores a CPS-PDU in the middle of generation, with respect to each second internal address. The CPS-PDU transmission section sends the CPS packet request signal to the CPS packet reception section when there is data in the second memory means, receives the CPS packet and the second internal address concerning the CPS packet from the CPS packet reception section, reads out the CPS-PDU in the middle of generation with respect to the second internal address from the CPS-PDU front part memory, adds the CPS packet to the CPS-PDU in the middle of generation with respect to the second internal address, sends a completed CPS-PDU and the second internal address concerning the CPS-PDU when a CPS-PDU is completed, and writes a CPS-PDU in the middle of generation in the CPS-PDU front part memory.

BRIEF DESCRIPTION OF THE DRAWINGS

The objects and features of the present invention will become more apparent from the consideration of the following detailed description taken in conjunction with the accompanying drawings, in which:

FIG. 2 is a table showing information which is stored in an ATM cell header search table shown in FIG. 1;

FIG. 7 is a block diagram showing detailed composition of a CPS-PDU processing section of the AAL2 packet exchange device of FIG. 4;

FIG. 8 is a block diagram showing detailed composition of a CPS-PDU generation section of the AAL2 packet exchange device of FIG. 4;

DESCRIPTION OF THE PREFERRED EMBODIMENTS

Figure 1:
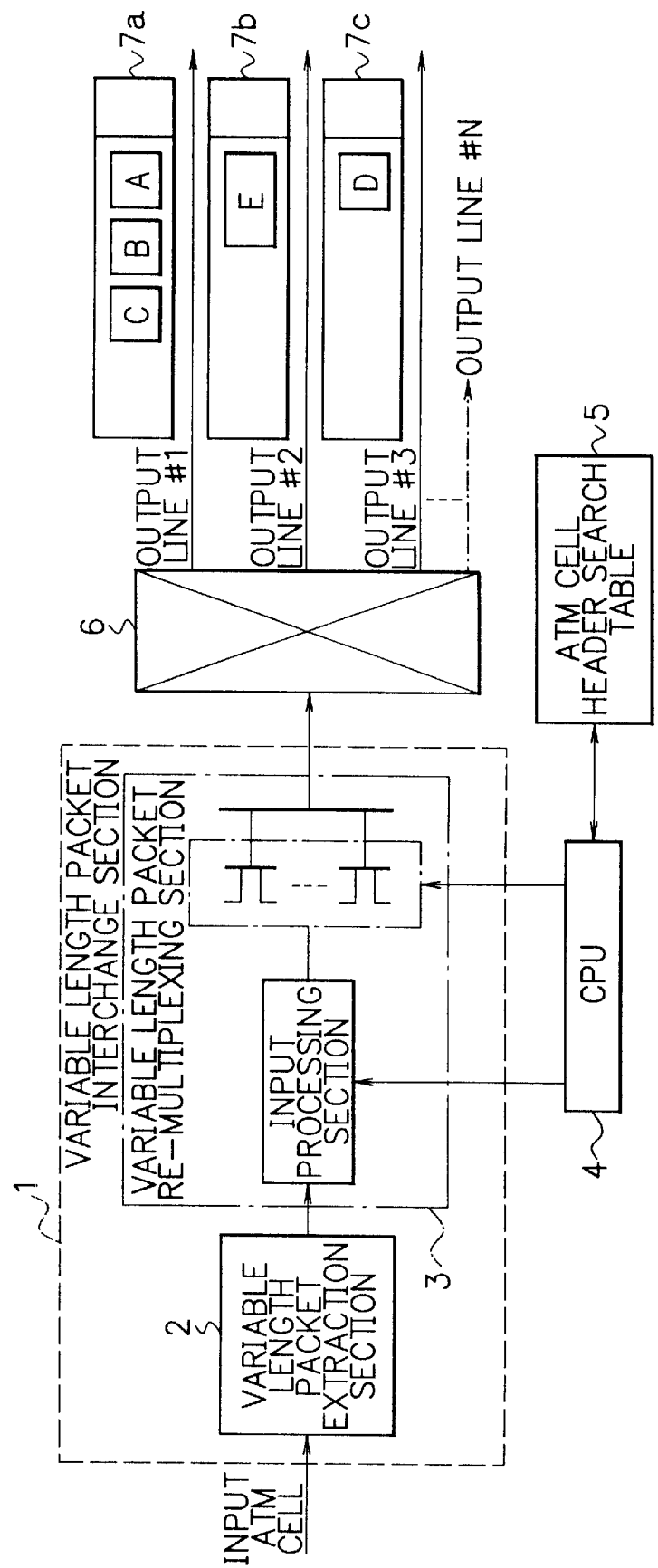
FIG. 1 is a schematic block diagram showing an example of a conventional AAL2 packet exchange device.
Figure 3:
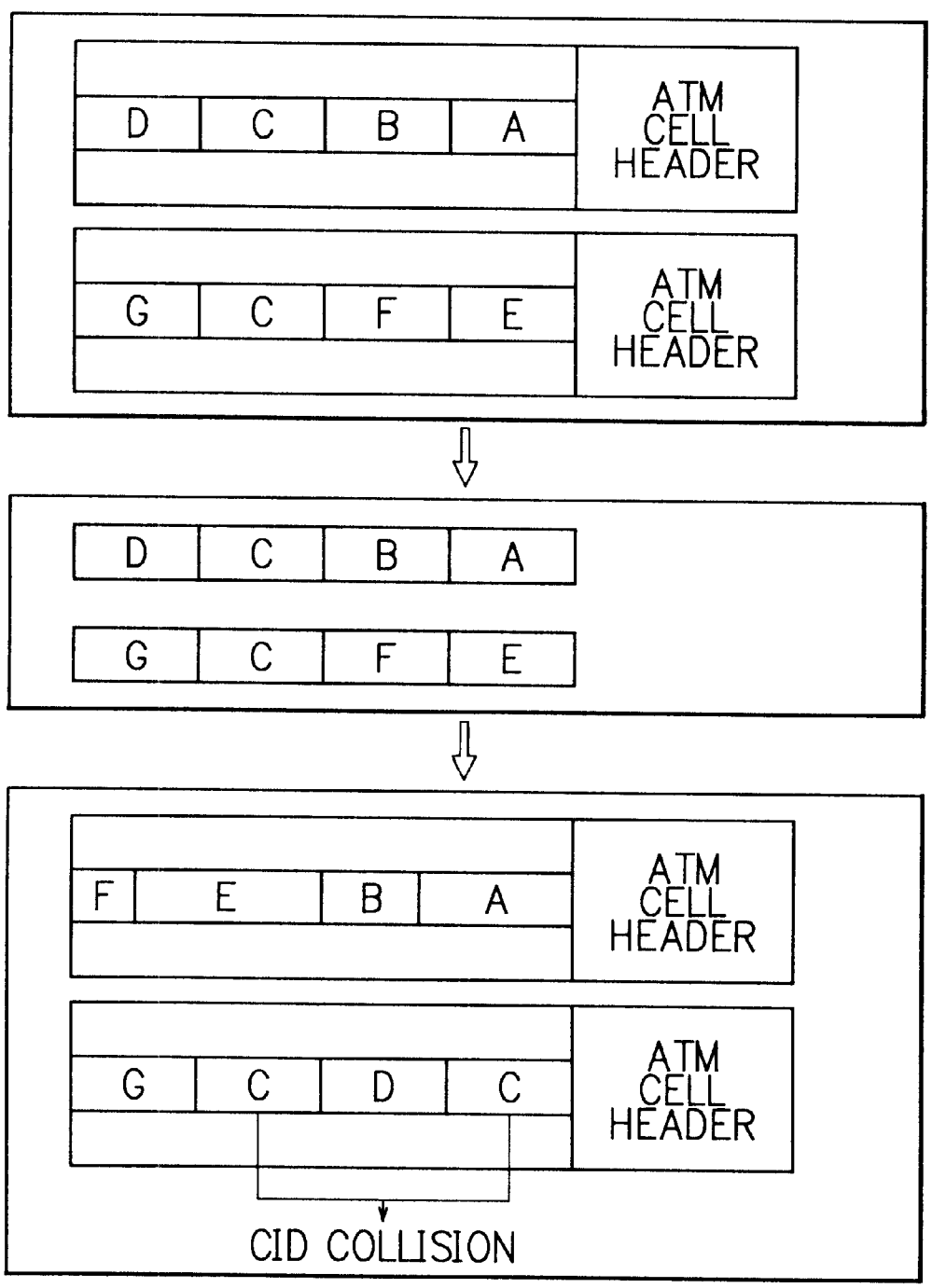
FIG. 3 is a schematic diagram showing variable length packet interchange operation which is executed by the conventional AAL2 packet exchange device of FIG. 1.

Referring now to the drawings, a description will be given in detail of preferred embodiments in accordance with the present invention.

Figure 4:
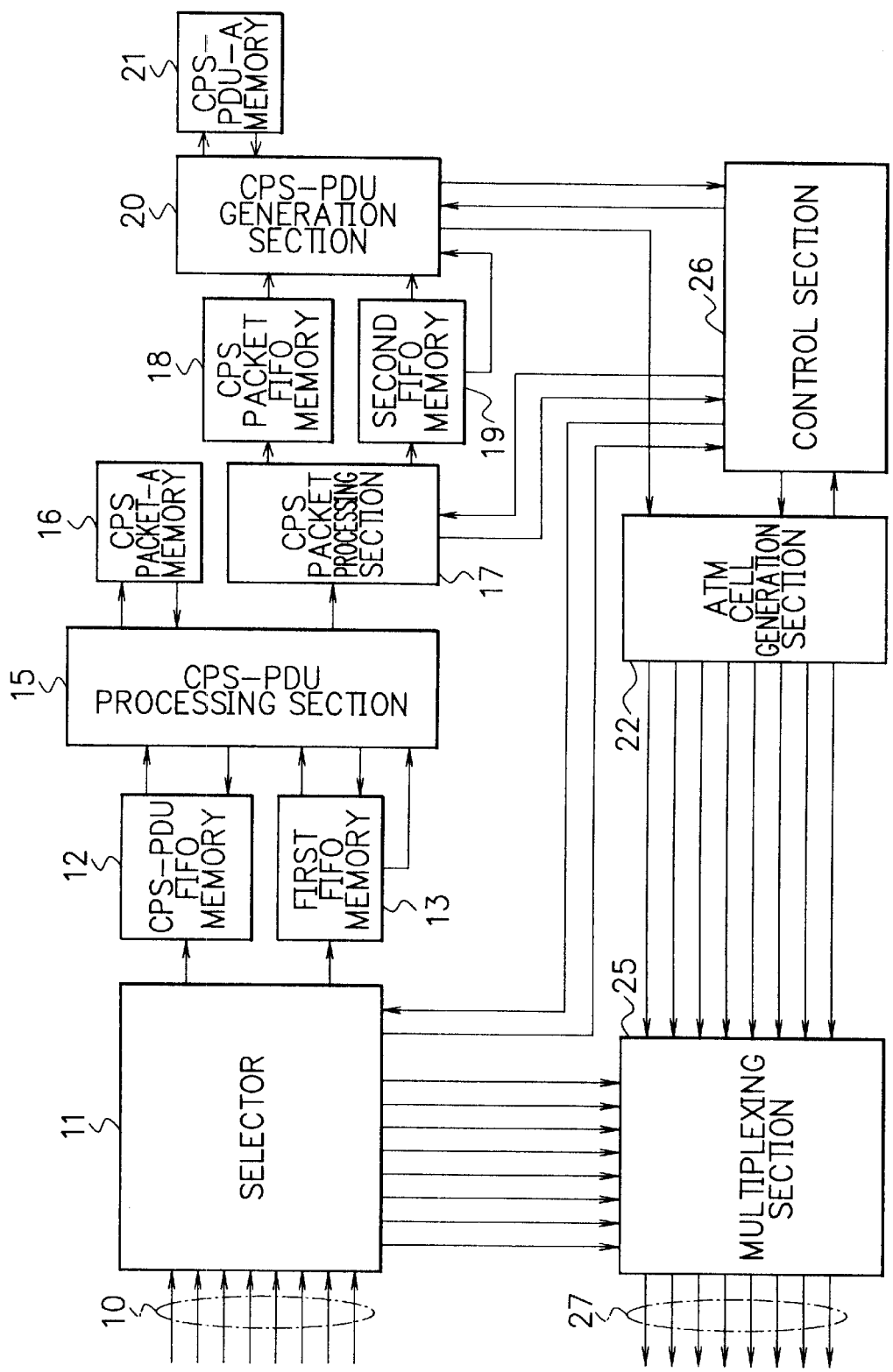
FIG. 4 is a block diagram showing composition of an AAL2 packet exchange device according to an embodiment of the present invention.
Figure 5:
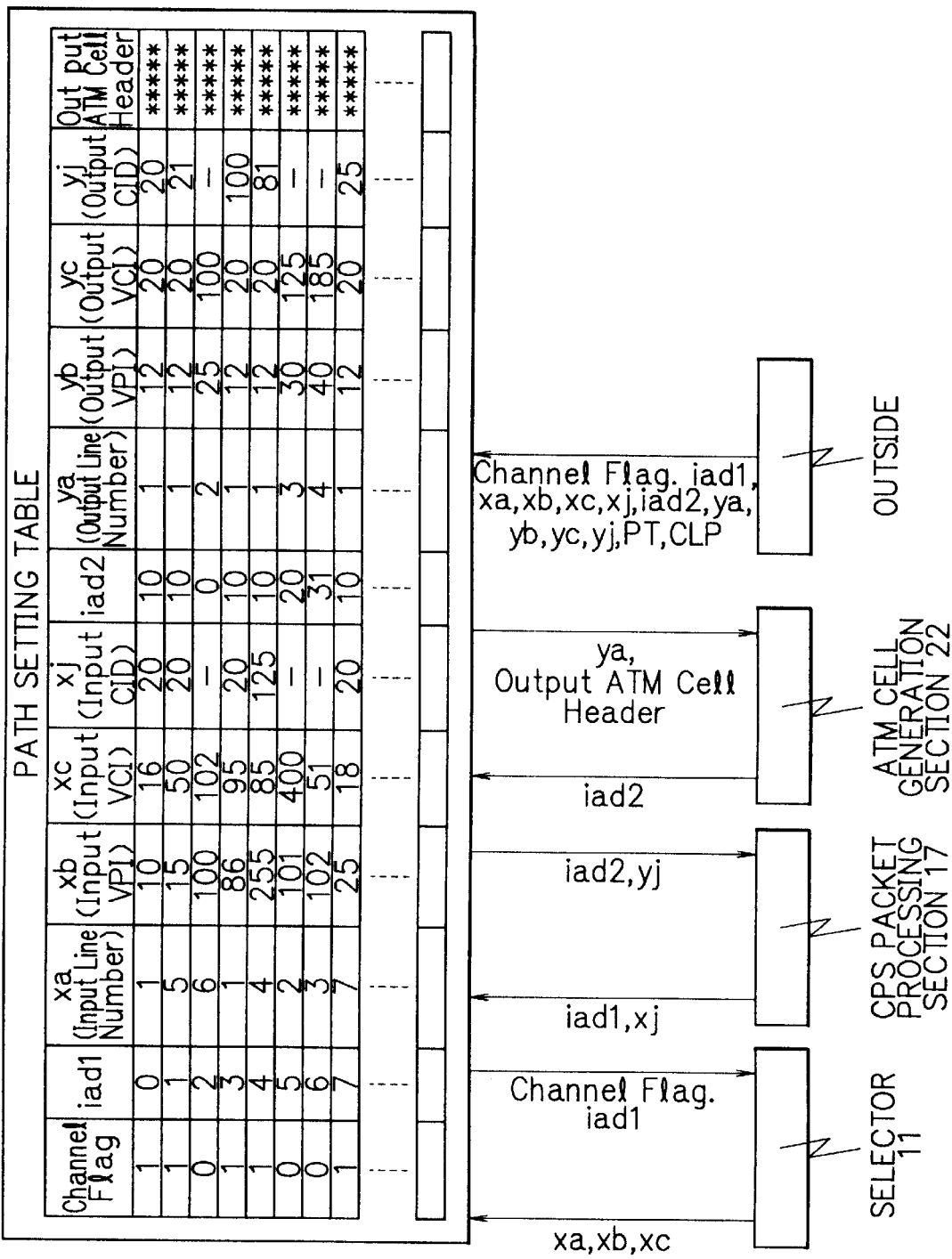
FIG. 5 is a schematic diagram showing a path setting table which is provided to a control section of the AAL2 packet exchange device of FIG. 4.

FIG. 4 is a block diagram showing composition of an AAL2 packet exchange device according to an embodiment of the present invention. FIG. 5 is a schematic diagram showing a path setting table which is provided to a control section 26 of the AAL2 packet exchange device.

The AAL2 packet exchange device of FIG. 4 is placed in front of an unshown ATM switch in the same way as the variable length packet interchange device 1 which has been shown in FIG. 1. The AAL2 packet exchange device comprises a selector (SEL) 11, a CPS-PDU FIFO memory (Common Part Sublayer-Protocol Data Unit Fast In Fast Out memory) 12, a first FIFO memory 13, a CPS-PDU processing section 15, a CPS packet-A memory 16, a CPS packet processing section 17, a CPS packet FIFO memory 18, a second FIFO memory 19, a CPS-PDU generation section 20, a CPS-PDU-A memory 21, an ATM cell generation section 22, a multiplexing section (MUX) 25, and the control section (CTL) 26.

The AAL2 packet exchange device of FIG. 4 has 8 input ports (8 ATM input interfaces) and 8 output ports (8 ATM output interfaces), and thus 8 input ATM lines 10 are connected to the selector 11 and 8 output ATM lines 27 are connected to the multiplexing section 25. Incidentally, the number of the input/output ports can be varied adequately. The components of the AAL2 packet exchange device of FIG. 4 are realized by, for example, one or more microprocessor units which are composed of one or more CPUs (Central Processing Units), ROM (Read Only Memory), RAM (Random Access Memory), etc.

Figure 6:
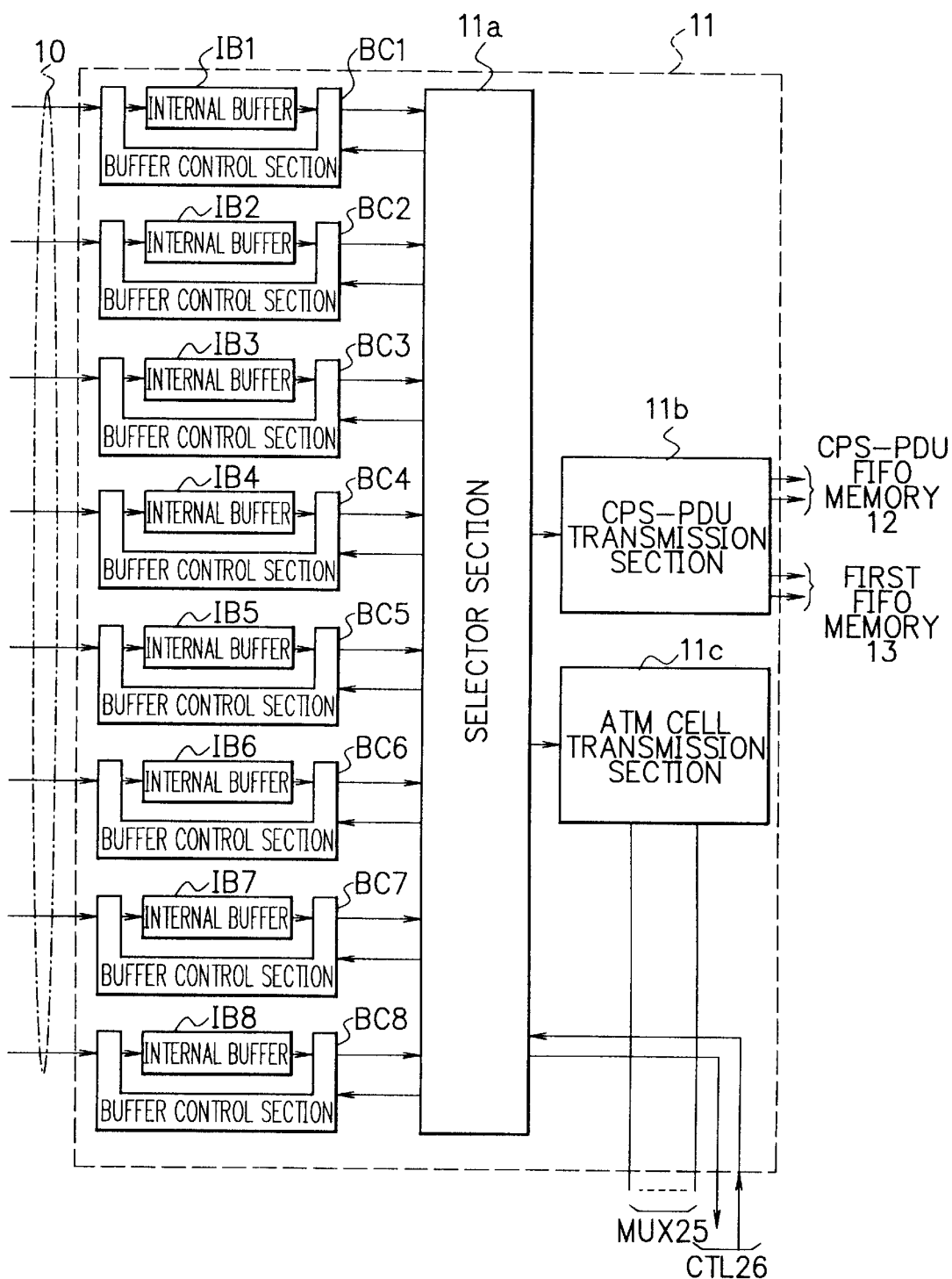
FIG. 6 is a block diagram showing detailed composition of a selector of the AAL2 packet exchange device of FIG. 4.

FIG. 6 is a block diagram showing detailed composition of the selector 11 of the AAL2 packet exchange device of FIG. 4. The selector 11 includes buffer control sections BC1, BC2, BC3, BC4, BC5, BC6, BC7 and BC8, internal buffers IB1, IB2, IB3, IB4, IB5, IB6, IB7 and IB8, a selector section 11a, a CPS-PDU transmission section 11b and ATM cell transmission section 11c.

FIG. 7 is a block diagram showing detailed composition of the CPS-PDU processing section 15 of the AAL2 packet exchange device of FIG. 4. The CPS-PDU processing section 15 includes a CPS-PDU reception section 15a, a CPS-PDU payload buffer 15b and a CPS packet extraction/regeneration section 15c.

FIG. 8 is a block diagram showing detailed composition of the CPS-PDU generation section 20 of the AAL2 packet exchange device of FIG. 4. The CPS-PDU generation section 20 includes a CPS packet reception section 20a, a CPS-PDU transmission section 20b and a memory interface section 20c.

The AAL2 packet exchange device of this embodiment handles ATM cells, CPS-PDUs and CPS packets (48 bytes or less) as information packets. In this document, the following notation will hereafter be used concerning them.

Concerning the ATM cell, the following notation will hereafter be used.

"xa": the input line number of an input ATM cell
"xb": the input VPI (Virtual Path Identifier) of an input ATM cell
"xc": the input VCI (Virtual Channel Identifier) of an input ATM cell
"xd": the PT (Payload Type) of an input ATM cell
"xe": the CLP (Cell Loss Priority) of an input ATM cell
"xf": the HEC (Header Error Control) of an input ATM cell
"ya": the output line number of an output ATM cell
"yb": the output VPI of an output ATM cell "yc": the output VCI of an output ATM cell
"yd": the PT of an output ATM cell
"ye": the CLP of an output ATM cell
"yf": the HEC of an output ATM cell Concerning the CPS-PDU, the following notation will hereafter be used.

"xg": the pointer value of an input CPS-PDU header (xg≦47)
"xh": the sequence number of an input CPS-PDU header
"xi": the parity of an input CPS-PDU header
"yg": the pointer value of an output CPS-PDU header (yg≦47)
"yh": the sequence number of an output CPS-PDU header
"yi": the parity of an output CPS-PDU header Concerning the CPS packet, the following notation will hereafter be used.

"xj": the CID (Channel IDentifier) of an input CPS packet header
"xk": the LI (Length Indicator) of an input CPS packet header (xk<45)
"xl": the UUI (User-to-User Indication) of an input CPS packet header
"xm": the HEC of an input CPS packet header
"yj": the CID of an output CPS packet header
"yk": the LI of an output CPS packet header (yk<45)
"yl": the UUI of an output CPS packet header
"ym": the HEC of an output CPS packet header In addition, hereafter, the front part of a CPS packet which has been split (which overlaps) across two CPS-PDUs will be referred to as a "CPS packet-A", and a CPS-PDU in the middle of generation (construction) will be referred to as a "CPS-PDU-A".

In the following, the operation of the AAL2 packet exchange device according to the embodiment of the present invention will be described.

FIG. 9A through FIG. 9D are schematic diagrams indicating CPS packet interchange operation which is executed by the AAL2 packet exchange device of this embodiment. Incidentally, each of the characters "A", "B", "C", . . . in FIG. 9A through FIG. 9D indicates CID information of the header of each CPS packet. FIG. 10 is a schematic diagram showing the relationship between the ATM cell, the CPS-PDU and the CPS packet. As mentioned before, according to the AAL2, the payload (48-byte information field) of an ATM cell is used for carrying a CPS-PDU (48 bytes). The 48-byte CPS-PDU is composed of a CPS-PDU header (1 byte) and a CPS-PDU payload (47 bytes), and CPS packets are filled (multiplexed) in the CPS-PDU payload. The CPS packet is a variable length packet whose maximum length is 48 bytes, which is composed of a CPS packet header (3 bytes) and a CPS packet payload (45 bytes or less). In the CPS packet header, a CID (Channel IDentifier) (1 byte), which will be used for designating the logical channel of each CPS packet, is included.

First, the overall operation of the AAL2 packet exchange device will be explained briefly referring to FIG. 4 and FIGS. 9A through 9D.

Figure 9A:
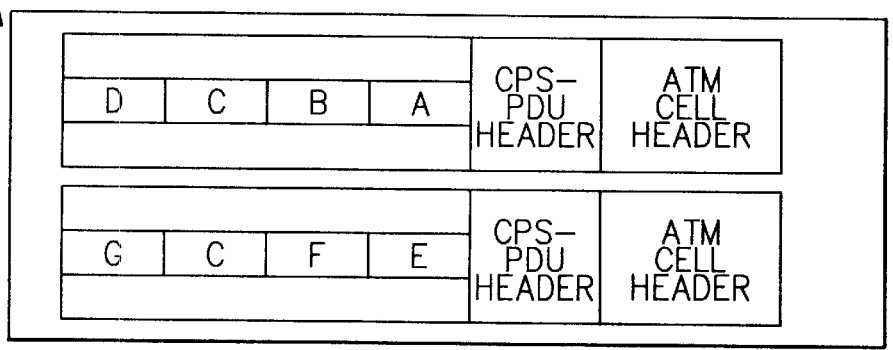
FIG. 9A through FIG. 9D are schematic diagrams indicating CPS packet interchange operation which is executed by the AAL2 packet exchange device of FIG. 4.
Figure 9B:
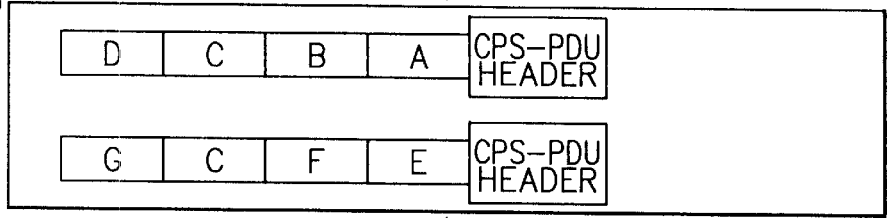
Figure 10:
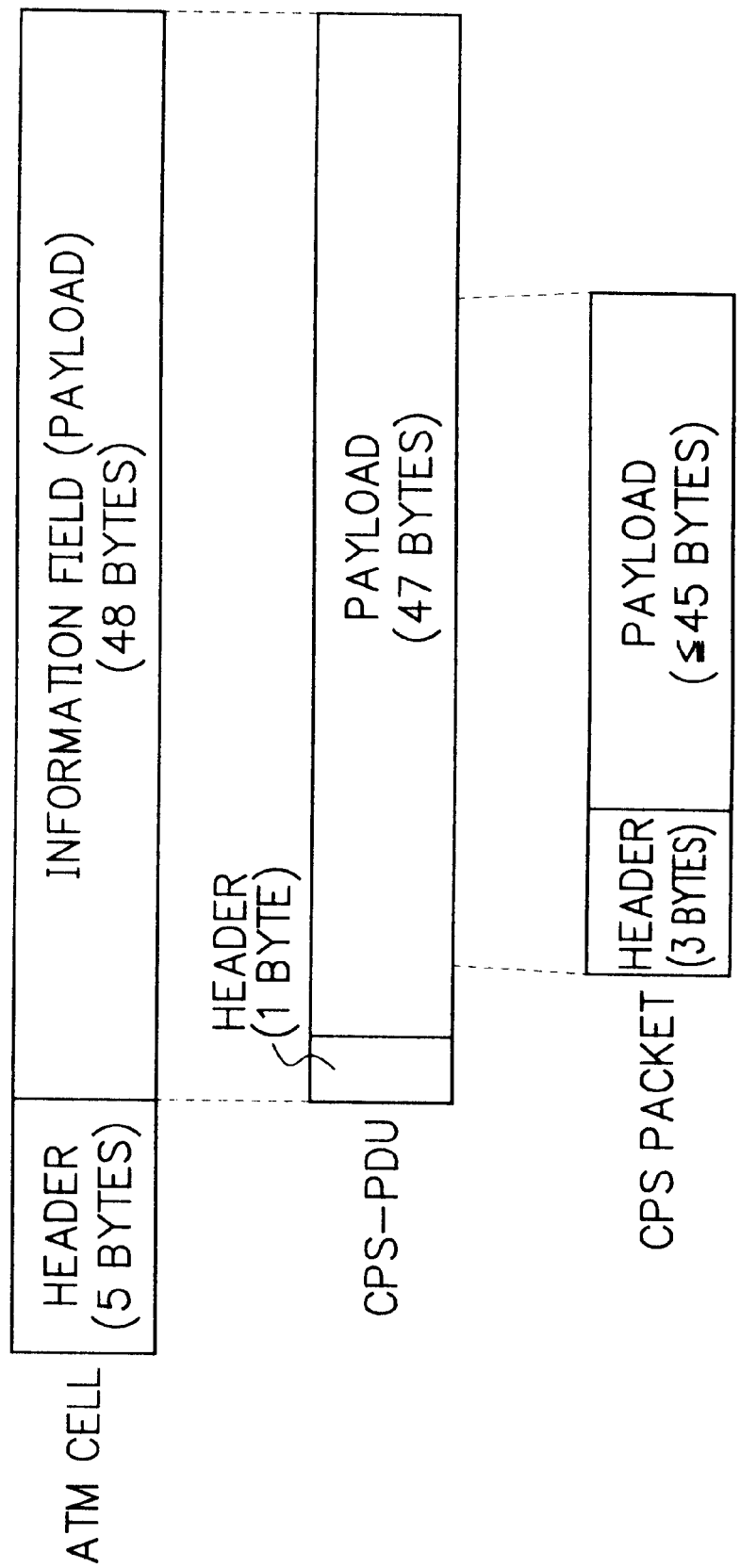
FIG. 10 is a schematic diagram showing the relationship between an ATM cell, a CPS-PDU and a CPS packet.

In the AAL2 packet exchange device of FIG. 4, the selector 11 receives ATM cells which are supplied via a plurality of input ATM lines (FIG. 9A). In the example of FIG. 4, the selector 11 has 8 ATM input ports (interfaces). Subsequently, the selector 11 judges whether or not each of the ATM cells contains CPS packets (AAL2 packets), separates the ATM cells into ATM cells containing CPS packets and ATM cells not containing CPS packets, and directly sends the ATM cells not containing CPS packets to the multiplexing section 25 so as to be outputted to the ATM switch. The selector 11 extracts CPS-PDUs from the ATM cells containing CPS packets (FIG. 9B). The CPS-PDUs extracted by the selector 11 are stored in the CPS-PDU FIFO memory 12, and meanwhile, the selector 11 receives internal addresses #1 (iad1) concerning each of the CPS-PDUs from the control section 26 and stores the internal addresses #1 (iad1) in the first FIFO memory 13.

Figure 9C:
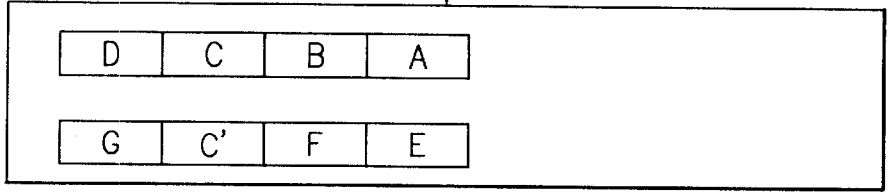

The CPS-PDU processing section 15 extracts CPS packets from the CPS-PDU which has been stored in the CPS-PDU FIFO memory 12, and also regenerates a CPS packet which has been split across two CPS-PDUs, using the CPS packet-A memory 16. The CPS packet-A memory 16 is a memory for storing the CPS packet-A (the front part of a CPS packet which has been split across two CPS-PDUs). The CPS packet processing section 17 rewrites (alters) CID information of each CPS packet supplied from the CPS-PDU processing section 15, and rewrites (alters) HEC (Header Error Control) information of each CPS packet (FIG. 9C).

The CPS packet FIFO memory 18 stores the CPS packets outputted by the CPS packet processing section 17, and the second FIFO memory 19 stores internal addresses #2 (iad2) and LI information (yk) concerning each of the CPS packets stored in the CPS packet FIFO memory 18. The internal addresses #2 (iad2) concerning each of the CPS packets are supplied from the control section 26 to the CPS packet processing section 17, and stored in the second FIFO memory 19. The CPS-PDU generation section 20 generates a CPS-PDU by multiplexing the CPS packets (which have been stored in the CPS packet FIFO memory 18) corresponding to the same internal address #2 (iad2). CPS-PDU-As (CPS-PDUs in the middle of generation (construction)) are temporarily stored in the CPS-PDU-A memory 21.

Figure 9D:
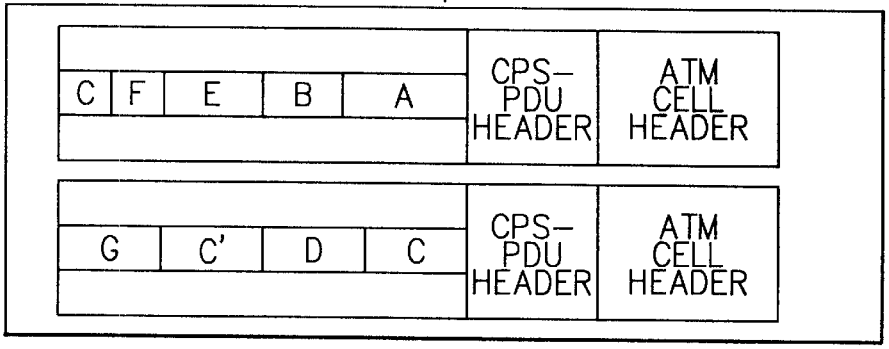

The ATM cell generation section 22 adds an appropriate ATM cell header to the CPS-PDU generated by the CPS-PDU generation section 20 and thereby outputs an ATM cell which includes the CPS-PDU (FIG. 9D). When there is no ATM cell to be outputted to an output line, the ATM cell generation section 22 generates and outputs an idle ATM cell to the output line.

The multiplexing section 25 time multiplexes the ATM cells supplied from the selector 11 and the ATM cells supplied from the ATM cell generation section 22, and outputs the multiplexed ATM cells to the output ATM lines 27.

The control section 26 controls the components of the AAL2 packet exchange device. For example, the control section 26 refers to the path setting table shown in FIG. 5 so that the CID information of each CPS packet will be rewritten (altered) by the CPS packet processing section 17 correctly.

In the following, the operations of the components of the AAL2 packet exchange device will be described in detail.

[Selector 11]

First, the operation of the selector 11 will be described in detail. Referring to FIG. 4, the selector 11 selects ATM cells including CPS packets (ATM cells including a CPS-PDU) from ATM cells which are supplied via the input ATM lines 10, and directly sends ATM cells which do not include CPS packets into the multiplexing section 25. With regard to each ATM cell including CPS packets, the selector 11 extracts a CPS-PDU from the ATM cell, receives an internal address #1 (iad1) concerning the ATM cell from the control section 26, writes the extracted CPS-PDU in the CPS-PDU FIFO memory 12, and writes the internal address #1 (iad1) in the first FIFO memory 13.

Referring to FIG. 6, the selector 11 is provided with the buffer control sections BC1~BC8 and the internal buffers IB1~IB8 corresponding to each of the 8 input ATM lines 10. Each of the internal buffers IB1~IB8 is provided in order to temporarily store an ATM cell supplied from the corresponding input ATM line 10. The internal buffer (IB1~IB8) is controlled by the corresponding buffer control section (BC1~BC8), and writing/reading of the ATM cell to/from the internal buffer (IB1~IB8) is executed by the buffer control section (BC1~BC8). The buffer control section (BC1~BC8) judges whether the input ATM cell supplied via the input ATM line 10 is an idle ATM cell (i.e. an ATM cell whose information field has been filled with dummy data) or not (i.e. an effective ATM cell), and writes only the effective ATM cells in the corresponding internal buffer (IB1~IB8). Meanwhile, the buffer control section (BC1~BC8) reads out the ATM cell from the corresponding internal buffer (IB1~IB8) in sync with an ATM cell transmission request signal which is supplied from the selector section 11a, and sends the ATM cell to the selector section 11a.

The selector section 11a periodically supplies the ATM cell transmission request signal to the buffer control sections BC1~BC8, and receives the (effective) ATM cells from the buffer control sections BC1~IBC8. After receiving the ATM cell from a buffer control section (BC1~IBC8), the selector section 11a extracts the VPI (xb) and the VCI (xc) from the received ATM cell, and sends the VPI (xb), the VCI (xc) and the input line number (xa) (1,2, . . . , or 8 that corresponds to the buffer control section that sent the ATM cell) to the control section 26. Subsequently, the selector section 11a receives an internal address #1 (iad1) and a channel flag from the control section 26, and determines where to send the ATM cell depending on the channel flag. Concretely, the selector section 11a sends the ATM cell and the internal address #1 (iad1) to the CPS-PDU transmission section 11b if the channel flag supplied from the control section 26 is "1", and sends the ATM cell and the input line number (xa) to the ATM cell transmission section 11c if the channel flag supplied from the control section 26 is "0". Details of the internal address #1 (iad1) and the channel flag (or the operation of the control section 26) will be explained later in an explanation of the operation of the control section 26.

The CPS-PDU transmission section 11b receives the ATM cell and the internal address #1 (iad1) from the selector section 11a, extracts a CPS-PDU from the received ATM cell, and writes the extracted CPS-PDU in the CPS-PDU FIFO memory 12, and writes the received internal address #1 (iad1) in the first FIFO memory 13.

The ATM cell transmission section 11c receives the ATM cell (not including a CPS-PDU) and the input line number (xa) from the selector section 11a, and outputs the ATM cell not including a CPS-PDU to the multiplexing section 25 via one of its output lines (i.e. via one of output lines of the selector 11) that corresponds to the input line number (xa). If there is no ATM cell to be outputted to an output line on ATM cell output timing, the ATM cell transmission section 11c outputs an idle ATM cell to the output line.

[CPS-PDU FIFO Memory 12]

Next, the operation of the CPS-PDU FIFO memory 12 will be described in detail. Referring to FIG. 4 and FIG. 6, the CPS-PDU FIFO memory 12 receives the CPS-PDUs from the selector 11 and stores the CPS-PDUs according to FIFO (First In First Out) operation. The CPS-PDUs stored in the CPS-PDU FIFO memory 12 are read out one by one according to FIFO operation by the CPS-PDU processing section 15.

[First FIFO Memory 13]

Next, the operation of the first FIFO memory 13 will be described in detail. Referring to FIG. 4 and FIG. 6, the first FIFO memory 13 receives the internal addresses #1 (iad1) from the selector 11 and stores the internal addresses #1 (iad1) according to FIFO operation. The internal addresses #1 (iad1) stored in the first FIFO memory 13 is read out one by one according to FIFO operation by the CPS-PDU processing section 15. Meanwhile, the first FIFO memory 13 generates an empty flag "0" if there is no internal address #1 (iad1) stored therein, and generates an empty flag "0" if there are one or more internal addresses #1 (iad1) stored therein. The first FIFO memory 13 outputs the empty flag "0" or "1" to the CPS-PDU processing section 15.

[CPS-PDU Processing Section 15]

Next, the operation of the CPS-PDU processing section 15 will be described in detail. Referring to FIG. 4, the CPS-PDU processing section 15 reads out the CPS-PDU from the CPS-PDU FIFO memory 12 and reads out the internal address #1 (iad1) from the first FIFO memory 13, when the empty flag ("0" or "1") supplied from the first FIFO memory 13 is "1" (indicating that there is data (an internal address #1 (iad1)) in the first FIFO memory 13). The CPS-PDU processing section 15 executes a CPS packet extraction/regeneration process with regard to the CPS-PDU read out from the CPS-PDU FIFO memory 12. For the CPS packet extraction/regeneration process, the CPS-PDU processing section 15 executes reading and writing of a CPS packet-A (the front part of a CPS packet which has been split across two CPS-PDUs) and CPS-PDU header check information to the CPS packet-A memory 16. After the CPS packet extraction/regeneration process with regard to the CPS-PDU, the CPS-PDU processing section 15 outputs the extracted/regenerated CPS packets, the internal address #1 (iad1) and CID information (xj) concerning the extracted/regenerated CPS packets to the CPS packet processing section 17.

Referring to FIG. 4 and FIG. 7, in the CPS-PDU processing section 15, the CPS packet extraction/regeneration section 15c sends a read start request signal to the CPS-PDU reception section 15a. The CPS-PDU reception section 15a which received the read start request signal reads out the CPS-PDU from the CPS-PDU FIFO memory 12 and reads out the internal address #1 (iad1) from the first FIFO memory 13. Subsequently, the CPS-PDU reception section 15a extracts a CPS-PDU header from the CPS-PDU, and sends the extracted CPS-PDU header and the internal address #1 (iad1) to the CPS packet extraction/regeneration section 15c. Meanwhile, the CPS-PDU reception section 15a extracts CPS-PDU payload information from the CPS-PDU, and writes the extracted CPS-PDU payload information in the CPS-PDU payload buffer 15b.

The CPS-PDU payload buffer 15b receives the CPS-PDU payload information from the CPS-PDU reception section 15a and stores the CPS-PDU payload information. The CPS-PDU payload information stored in the CPS-PDU payload buffer 15b is read out by the CPS packet extraction/regeneration section 15c. If a clear signal is supplied from the CPS packet extraction/regeneration section 15c, the CPS-PDU payload information stored in the CPS-PDU payload buffer 15b is abandoned.

The CPS packet extraction/regeneration section 15c receives the empty flag "0" (indicating that there is no internal address #1) or "1" (indicating that there are one or more internal addresses #1) from the first FIFO memory 13, and sends the read start request signal to the CPS-PDU reception section 15a if the empty flag is "1".

The CPS packet extraction/regeneration section 15c executes the CPS packet extraction/regeneration process as follows. The CPS packet extraction/regeneration section 15c receives the CPS-PDU header and the internal address #1 (iad1) from the CPS-PDU reception section 15a and stores them. Subsequently, the CPS packet extraction/regeneration section 15c reads out a CPS-PDU header check information from the CPS packet-A memory 16, using the internal address #1 (iad1) as a number corresponding to a read start address in the CPS packet-A memory 16, and stores the CPS-PDU header check information. The CPS-PDU header check information includes CPS packet-A length information ($0 \leq L \leq 47$), a sequence number (SNUM) ("0" or "1") and error check result information (ERR) ("0" or "1"). Subsequently, the CPS packet extraction/regeneration section 15c reads out a CPS packet-A which is L bytes length. Incidentally, the CPS-PDU header check information is generated by the CPS packet extraction/regeneration section 15c and stored in the CPS packet-A memory 16 in particular cases, as will be explained later. Subsequently, the CPS packet extraction/regeneration section 15c executes a parity check (odd parity check) to the CPS-PDU header which has been stored therein.

If a parity error occurred in the odd parity check, the CPS packet extraction/regeneration section 15c outputs the clear signal to the CPS-PDU payload buffer 15b and ends the CPS packet extraction/regeneration process. If the parity error did not occur, the CPS packet extraction/regeneration section 15c extracts the sequence number (SNUM) ("0" or "1") from the CPS-PDU header check information, and extracts a sequence number (xh) ("0" or "1") from the received CPS-PDU header, and compares the two sequence numbers. If the two sequence numbers are the same, the CPS packet extraction/regeneration section 15c judges that a sequence number error occurred, and then the CPS packet extraction/regeneration section 15c extracts pointer information (xg) from the CPS-PDU header and reads out (xg+1) bytes from the CPS-PDU payload buffer 15c.Subsequently, the CPS packet extraction/regeneration section 15c abandons the read data.

If the two sequence numbers are different, the CPS packet extraction/regeneration section 15c extracts pointer information (xg) from the CPS-PDU header and extracts LI information (xk) from the CPS packet-A, and extracts the CPS packet-A length information (L) from the CPS-PDU header check information, and thereafter checks whether or not an inequality "$L+xg \leq 48$" is satisfied. Incidentally, explanation of the CPS-PDU header check information (including the CPS packet-A length information (L)) which is generated by the CPS packet extraction/regeneration section 15c will be given later as mentioned above. If $L+xg>48$, the CPS packet extraction/regeneration section 15c judges that a splitting error occurred, and outputs the clear signal to the CPS-PDU payload buffer 15b and ends the CPS packet extraction/regeneration process.

If the inequality "$L+xg \leq 48$" is satisfied, the CPS packet extraction/regeneration section 15c extracts the error check result information (ERR) from the CPS-PDU header check information. If the error check result information (ERR) is "1" (indicating that an error occurred in the CPS packet extraction/regeneration process for the previous CPS-PDU), the CPS packet extraction/regeneration section 15c reads out xg bytes of data from the CPS-PDU payload buffer 15b, and abandons the xg bytes of data and the CPS packet-A which has been read out from the CPS packet-A memory 16. If the error check result information (ERR) is "0" (indicating that no error occurred in the CPS packet extraction/regeneration process for the previous CPS-PDU), the CPS packet extraction/regeneration section 15c reads out xg bytes of data from the CPS-PDU payload buffer 15b, and regenerates a CPS packet using the CPS packet-A and the xg bytes of data.

Subsequently, the CPS packet extraction/regeneration section 15c executes a CPS packet header check to the regenerated CPS packet. First, the CPS packet extraction/regeneration section 15c executes a HEC (Header Error Control) check to the header of the regenerated CPS packet. If a HEC error occurred in the HEC check, the CPS packet extraction/regeneration section 15c abandons the regenerated CPS packet, and outputs the clear signal to the CPS-PDU payload buffer 15b and ends the CPS packet extraction/regeneration process. If the HEC error did not occur in the HEC check, the CPS packet extraction/regeneration section 15c extracts the LI information (xk) from the CPS packet header and checks the LI information (xk). If $xk \geq 45$, the CPS packet extraction/regeneration section 15c outputs the clear signal to the CPS-PDU payload buffer 15b and ends the CPS packet extraction/regeneration process. If $xk \leq 45$, the CPS packet extraction/regeneration section 15c extracts CID information (xj) from the CPS packet header, and outputs the regenerated CPS packet, the internal address #1 (iad1) and the CID information (xj) to the CPS packet processing section 17.

After the first CPS packet has been extracted or the CPS packet extraction/regeneration section 15c has abandoned the (xg+1)-byte read data in the case where the sequence number error occurred, the CPS packet extraction/regeneration section 15c executes extraction of a CPS packet from the CPS-PDU payload information which has been stored in the CPS-PDU payload buffer 15b. First, the CPS packet extraction/regeneration section 15c reads out 3 bytes of information (i.e. a CPS packet header) from the CPS-PDU payload buffer 15b, and executes the HEC check and the check of the LI information (xk) to the CPS packet header. If the HEC error occurred or $xk \geq 45$ in the checks, the CPS packet extraction/regeneration section 15c outputs the clear signal to the CPS-PDU payload buffer 15b and ends the CPS packet extraction/regeneration process. If the HEC error did not occur and $xk<45$ in the checks, the CPS packet extraction/regeneration section 15c reads out xk bytes of data (i.e. a CPS packet payload) from the CPS-PDU payload buffer 15b, adds the CPS packet payload to the CPS packet header, and thereby completes the extraction of a CPS packet. Thereafter the CPS packet extraction/regeneration section 15c outputs the regenerated CPS packet, the internal address #1 (iad1) and the CID information (xj) to the CPS packet processing section 17.

By repeating the process described above, the CPS packet extraction/regeneration section 15c executes extraction/regeneration of CPS packets. When data is read out from the CPS-PDU payload buffer 15b as above, the number of bytes of data which has been read out so far is counted up, and the above process is repeated until the counted number becomes 47. The counted number is stored in a register when reading of one CPS packet from the CPS-PDU payload buffer 15b is completed.

In the CPS packet extraction/regeneration process, the CPS packet extraction/regeneration section 15c generates the aforementioned CPS-PDU header check information when the counted number is 47 or when an error occurred.

In the case where the counted number is 47, the CPS packet extraction/regeneration section 15c sets the CPS packet-A length information (L) at (47—the current value of the register), sets the error check result information (ERR)

at 0, extracts the sequence number (xh) from the CPS-PDU header stored therein, sets the sequence number (SNUM) of the CPS-PDU header check information at xh, and thereby generates (completes) the CPS-PDU header check information. Subsequently, the CPS packet extraction/regeneration section 15c regards the CPS packet in the middle of extraction/regeneration as a CPS packet-A, and writes the CPS packet-A and the CPS-PDU header check information in the CPS packet-A memory 16 using the internal address #1 (iad1) as a number corresponding to a write start address.

In the case where an error, except a sequence number error occurred, the CPS packet extraction/regeneration section 15c sets the error check result information (ERR) at 1, sets the CPS packet-A length information (L) at 0, sets the sequence number (SNUM) at 0, and thereby generates (completes) the CPS-PDU header check information. Subsequently, the CPS packet extraction/regeneration section 15c writes the CPS-PDU header check information in the CPS packet-A memory 16 using the internal address #1 (iad1) as a number corresponding to a write start address.

After finishing the above CPS packet extraction/regeneration process, the CPS packet extraction/regeneration section 15c refers to the first FIFO memory 13 and checks the empty flag. If the empty flag is "1" (indicating that there are one or more internal addresses #1), the CPS packet extraction/regeneration section 15c sends the read start request signal to the CPS-PDU reception section 15a and thereby starts the next CPS packet extraction/regeneration process for the next CPS-PDU.

[CPS Packet-A Memory 16]

Next, the operation of the CPS packet-A memory 16 will be described in detail. Referring to FIG. 4, the CPS packet-A memory 16 receives the CPS packet-A and the CPS-PDU header check information from the CPS-PDU processing section 15 (CPS packet extraction/regeneration section 15c), and stores the CPS packet-A and the CPS-PDU header check information. The CPS packet-A memory 16 stores one CPS packet-A and a piece of CPS-PDU header check information with respect to each internal address #1 (iad1). The CPS packet-A and the CPS-PDU header check information stored in the CPS packet-A memory 16 are read out and used by the CPS-PDU processing section 15 (CPS packet extraction/regeneration section 15c).

[CPS Packet Processing Section 17]

Next, the operation of the CPS packet processing section 17 will be described in detail. Incidentally, hereafter, the CID information after a CPS packet header alteration process (which is executed by the CPS packet processing section 17) will be referred to as "CID information (yj)", as mentioned before. In the same way, the LI information, the UUI information and the HEC information after the CPS packet header alteration process will be referred to as "LI information (yk)", "UUI information (yl)" and "HEC information (ym)", respectively.

Referring to FIG. 4, the CPS packet processing section 17 receives the (extracted/regenerated) CPS packet, the internal address #1 (iad1) and the CID information (xj) concerning the CPS packet from the CPS-PDU processing section 15, and stores them. Subsequently, the CPS packet processing section 17 sends the internal address #1 (iad1) and the CID information (xj) to the control section 26, and receives an internal address #2 (iad2) and CID information (yj) from the control section 26. The CPS packet processing section 17 is provided with an unshown CPS packet header processing section. The CPS packet header processing section overwrites the CID information (yj) into the CID information area of the received CPS packet header, and thereby CID alteration is executed. Subsequently, the CPS packet header processing section computes the HEC (ym) of the CPS packet header, and overwrites the HEC information (ym) into the HEC information area of the CPS packet header. Subsequently, the CPS packet processing section 17 extracts LI information (yk) from the CPS packet header (Incidentally, the LI information in the CPS packet header has not changed and thus yk=xk.). Subsequently, the CPS packet processing section 17 writes the CPS packet (after the CPS packet header alteration process) in the CPS packet FIFO memory 18, and outputs the internal address #2 (iad2) and the LI information (yk) concerning the CPS packet to the second FIFO memory 19.

[CPS Packet FIFO Memory 18]

Next, the operation of the CPS packet FIFO memory 18 will be described in detail. Referring to FIG. 4, the CPS packet FIFO memory 18 receives the CPS packets after the CPS packet header alteration process from the CPS packet processing section 17 and stores the CPS packets according to FIFO operation. The CPS packets stored in the CPS packet FIFO memory 18 are read out one by one according to FIFO operation by the CPS-PDU generation section 20.

[Second FIFO Memory 19]

Next, the operation of the second FIFO memory 19 will be described in detail. Referring to FIG. 4, the second FIFO memory 19 receives the internal addresses #2 (iad2) and the LI information (yk) from the CPS packet processing section 17 and stores them according to FIFO operation. The internal addresses #2 (iad2) and the LI information (yk) stored in the second FIFO memory 19 are read out according to FIFO operation by the CPS-PDU generation section 20. Meanwhile, the second FIFO memory 19 generates an empty flag "0" when there is no data stored therein, and generates an empty flag "1" when there is data stored therein, and outputs the empty flag "0" or "1" to the CPS-PDU generation section 20.

[CPS-PDU Generation Section 20]

Next, the operation of the CPS-PDU generation section 20 will be described in detail. Referring to FIG. 4, the CPS-PDU generation section 20 constantly receives the empty flag ("1": there is data, "0": no data) from the second FIFO memory 19, and executes a CPS-PDU generation process when the empty flag is "1". For executing the CPS-PDU generation process, the CPS-PDU generation section 20 reads out CPS packets from the CPS packet FIFO memory 18, reads out internal addresses #2 (iad2) and LI information (yk) from the second FIFO memory 19, and executes reading and writing of a CPS-PDU-A and CPS-PDU-A effective length information to the CPS-PDU-A memory 21. When a CPS-PDU is completed by the CPS-PDU generation process, the CPS-PDU generation section 20 outputs the completed CPS-PDU and an internal address #2 (iad2) concerning the completed CPS-PDU to the ATM cell generation section 22, and sends a CPS-PDU output information signal and the internal address #2 (iad2) to the control section 26. The CPS-PDU generation section 20 also receives a CPS-PDU output request signal and an internal address #2 (iad2) which are sent from the control section 26.

Referring to FIG. 8, in the CPS-PDU generation section 20, the CPS-PDU transmission section 20b sends a CPS packet request signal to the CPS packet reception section 20a. When the CPS packet request signal is supplied from the CPS-PDU transmission section 20b, the CPS packet reception section 20a reads out the internal address #2 (iad2) and the LI information (yk) from the second FIFO memory 19. Subsequently, the CPS packet reception section 20a reads out (yk+3) bytes of data (i.e. one CPS packet) from the CPS packet FIFO memory 18, and writes the CPS packet and the internal address #2 (iad2) in the CPS-PDU transmission section 20b.

The memory interface section 20c receives the internal address #2 (iad2) from the CPS-PDU transmission section 20b, reads out the CPS-PDU-A (48 bytes) and CPS-PDU-A effective length information from the CPS-PDU-A memory 21 using the internal address #2 (iad2) as a number corresponding to a read start address, and sends the CPS-PDU-A and the CPS-PDU-A effective length information to the CPS-PDU transmission section 20b. On the other hand, when the memory interface section 20c received an internal address #2 (iad2), a CPS-PDU-A and CPS-PDU-A effective length information from the CPS-PDU transmission section 20b, the memory interface section 20c writes the CPS-PDU-A and the CPS-PDU-A effective length information in the CPS-PDU-A memory 21 using the internal address #2 (iad2) as a number corresponding to a write start address.

The CPS-PDU transmission section 20b constantly receives the empty flag ("1": there is data, "0": no data) from the second FIFO memory 19, and executes the CPS-PDU generation process when the empty flag is "1".

In the CPS-PDU generation process, the CPS-PDU transmission section 20b first sends the CPS packet request signal to the CPS packet reception section 20a, receives the CPS packet and the internal address #2 (iad2) from the CPS packet reception section 20a, and stores them. Subsequently, the CPS-PDU transmission section 20b sends the internal address #2 (iad2) to the memory interface section 20c, receives the CPS-PDU-A and the CPS-PDU-A effective length information from the memory interface section 20c, and stores them. Subsequently, the CPS-PDU transmission section 20b extracts the LI information (yk) from the received CPS packet, extracts data (of the length designated by the CPS-PDU-A effective length information) from the 48-byte CPS-PDU-A starting from its front end, and stores the extracted data as a "CPS-PDU-AA".

Subsequently, the CPS-PDU transmission section 20b calculates a number: (CPS-PDU-A effective length+yk+3), and thereafter executes the following processes depending on the number.

In the case where (CPS-PDU-A effective length+yk+3) <48, it can be judged that splitting of a CPS packet across two CPS-PDUs has not occurred and a CPS-PDU has not been completed. In this case, the CPS-PDU transmission section 20b just adds the stored CPS packet to the CPS-PDU-AA. Subsequently, the CPS-PDU transmission section 20b updates the CPS-PDU-A effective length information according to the equation: (CPS-PDU-A effective length (after update))=(CPS-PDU-A effective length (before update)+(yk+3)), adds 0-data "00 . . . 0" to the CPS-PDU-AA so that the CPS-PDU-AA will be a 48-byte CPS-PDU-A, and outputs the CPS-PDU-A, the CPS-PDU-A effective length information and the internal address #2 (iad2) to the memory interface section 20c.

In the case where (CPS-PDU-A effective length+yk+3)= 48, it can be judged that splitting of a CPS packet across two CPS-PDUs has not occurred but a CPS-PDU has been completed. In this case, the CPS-PDU transmission section 20b adds the stored CPS packet to the CPS-PDU-AA and thereafter treats the CPS-PDU-AA (to which the CPS packet has been added) as a completed CPS-PDU.

Subsequently, the CPS-PDU transmission section 20b generates a header of a new (next) CPS-PDU-A. With regard to the newly generated CPS-PDU-A, the CPS-PDU transmission section 20b sets pointer information (yga) at 0, sets sequence number information (yha) at (yh (i.e. the sequence number of the completed CPS-PDU)+1), and thereafter writes them in the header area of the new CPS-PDU-A. Subsequently, the CPS-PDU transmission section 20b executes parity operation (odd parity operation) to the CPS-PDU-A header, sets parity information (yia) (i.e. the parity bit) of the CPS-PDU-A header according to the parity operation, and thereby completes the CPS-PDU-A header. Thereafter, the CPS-PDU transmission section 20b fills 0-data in the payload of the CPS-PDU-A and sets the CPS-PDU-A effective length information at 1 (Only the header is effective.).

After the above operations, the CPS-PDU transmission section 20b outputs the completed CPS-PDU and the internal address #2 (iad2) to the ATM cell generation section 22, and outputs the new CPS-PDU-A, the CPS-PDU-A effective length information and the internal address #2 (iad2) to the memory interface section 20c.

In the case where (CPS-PDU-A effective length+yk+3) ≧48, it can be judged that splitting of a CPS packet across two CPS-PDUs has occurred. In this case, the CPS-PDU transmission section 20b cuts (48−CPS-PDU-A effective length) bytes of data off the CPS packet stored therein, adds the data to the CPS-PDU-AA, and thereby completes a CPS-PDU. Subsequently, the CPS-PDU transmission section 20b generates a header of a new (next) CPS-PDU-A. With respect to the newly generated CPS-PDU-A, the CPS-PDU transmission section 20b sets pointer information (yga) at (CPS-PDU-A effective length+(yk+3)−48), sets sequence number information (yha) at (yh (i.e. the sequence number of the completed CPS-PDU)+1), and thereafter writes them in the header area of the new CPS-PDU-A. Subsequently, the CPS-PDU transmission section 20b executes parity operation (odd parity operation) to the CPS-PDU-A header, sets parity information (yia) (i.e. the parity bit) of the CPS-PDU-A header according to the parity operation, and thereby completes the CPS-PDU-A header. Thereafter, the CPS-PDU transmission section 20b writes the remainder of the CPS packet (after the cut off) in the payload of the CPS-PDU-A, fills 0-data so that a 48-byte CPS-PDU-A will be completed, and sets the CPS-PDU-A effective length information at yga+1.

After the above operations, the CPS-PDU transmission section 20b outputs the completed CPS-PDU and the internal address #2 (iad2) to the ATM cell generation section 22, and outputs the new CPS-PDU-A, the CPS-PDU-A effective length information and the internal address #2 (iad2) to the memory interface section 20c.

The CPS-PDU transmission section 20b outputs an internal address #2 (iad2) stored therein and the CPS-PDU output information signal to the control section 26 on every output of one completed CPS-PDU.

In cases where the CPS-PDU transmission section 20b received a CPS-PDU output request signal and an internal address #2 (iad2) from the control section 26, the CPS-PDU transmission section 20b first completes a CPS-PDU generation process which has been in process, and thereafter outputs the internal address #2 (iad2) to the memory interface section 20c, receives a CPS-PDU-A and CPS-PDU-A effective length information from the memory interface section 20c, and thereafter treats the received CPS-PDU-A as a completed CPS-PDU.

Subsequently, the CPS-PDU transmission section 20b generates a header of a new (next) CPS-PDU-A. With respect to the newly generated CPS-PDU-A, the CPS-PDU transmission section 20b sets pointer information (yga) at 0, sets sequence number information (yha) at (yh (i.e. the sequence number of the completed CPS-PDU)+1), and thereafter writes them in the header area of the new CPS-PDU-A. Subsequently, the CPS-PDU transmission section 20*b* executes parity operation (odd parity operation) to the CPS-PDU-A header, sets parity information (yia) (i.e. the parity bit) of the CPS-PDU-A header according to the parity operation, and thereby completes the CPS-PDU-A header. Thereafter, the CPS-PDU transmission section 20*b* fills 0-data in the payload of the CPS-PDU-A and sets the CPS-PDU-A effective length information at 1 (Only the header is effective.).

After the above operations, the CPS-PDU transmission section 20*b* outputs the completed CPS-PDU and the internal address #2 (iad2) to the ATM cell generation section 22, and outputs the new CPS-PDU-A, the CPS-PDU-A effective length information and the internal address #2 (iad2) to the memory interface section 20*c*.

When the CPS-PDU transmission section 20*b* outputs the completed CPS-PDU and the internal address #2 (iad2) to the ATM cell generation section 22, the CPS-PDU transmission section 20*b* also outputs the CPS-PDU output information signal and the internal address #2 (iad2) to the control section 26.

After finishing the above CPS-PDU generation process, the CPS-PDU transmission section 20*b* refers to the empty flag ("0" or "1") from the second FIFO memory 19, and starts the next CPS-PDU generation process if the empty flag is "1".

[CPS-PDU-A Memory 21]

Next, the operation of the CPS-PDU-A memory 21 will be described in detail. Referring to FIG. 4, the CPS-PDU-A memory 21 receives the CPS-PDU-A and the CPS-PDU-A effective length information from the CPS-PDU generation section 20 (the memory interface section 20*c*), and stores the CPS-PDU-A and the CPS-PDU-A effective length information. The CPS-PDU-A memory 21 stores one CPS-PDU-A and a piece of CPS-PDU-A effective length information with respect to each internal address #2 (iad2)). The CPS-PDU-A and the CPS-PDU-A effective length information stored in the CPS-PDU-A memory 21 are read out by the CPS-PDU generation section 20 (the memory interface section 20*c*).

[ATM Cell Generation Section 22]

Next, the operation of the ATM cell generation section 22 will be described in detail. Referring to FIG. 4, the ATM cell generation section 22 executes generation of ATM cells. In other words, the ATM cell generation section 22 loads the CPS-PDU supplied from the CPS-PDU generation section 20 in a new ATM cell, or generates an idle ATM cell. For generating the ATM cell containing the CPS-PDU, the ATM cell generation section 22 receives the (completed) CPS-PDU and the internal address #2 (iad2) from the CPS-PDU generation section 20, sends the internal address #2 (iad2) to the control section 26, receives output line number information (ya) and ATM cell header information from the control section 26, adds the ATM cell header information to the CPS-PDU supplied from the CPS-PDU generation section 20, and thereby completes an ATM cell. The ATM cell generated by the ATM cell generation section 22 is supplied to the multiplexing section 25.

Concretely, when the ATM cell generation section 22 received a CPS-PDU and an internal address #2 (iad2) from the CPS-PDU generation section 20, the ATM cell generation section 22 sends the internal address #2 (iad2) to the control section 26, receives an output line number information (ya) and ATM cell header information from the control section 26, adds the received ATM cell header information on top of the CPS-PDU supplied from the CPS-PDU generation section 20, and thereby generates an ATM cell.

Subsequently, the ATM cell generation section 22 outputs the ATM cell to one of its output lines which corresponds to the output line number information (ya) supplied from the control section 26. If there is no ATM cell to be outputted to an output line on ATM cell output timing, the ATM cell generation section 22 outputs an idle ATM cell to the output line.

[Multiplexing Section 25]

Next, the operation of the multiplexing section 25 will be described in detail. Referring to FIG. 4, the multiplexing section 25 multiplexes the ATM cells supplied from the ATM cell generation section 22 with the ATM cells directly supplied from the selector 11 (i.e. ATM cells not including CPS-PDUs), and outputs the ATM cells to the output ATM lines 27.

Concretely, in the case where the multiplexing section 25 received an effective ATM cell from the selector 11 via one of its input lines, the multiplexing section 25 outputs the effective ATM cell to one of the output ATM lines 27 that corresponds to the line number of the input line. In the case where the multiplexing section 25 received an idle ATM cell from the selector 11, the multiplexing section 25 abandons the idle ATM cell. In the case where the multiplexing section 25 received an effective ATM cell from the ATM cell generation section 22 via one of its input lines (which are connected to the ATM cell generation section 22), the multiplexing section 25 multiplexes the effective ATM cell in an ATM cell sequence which is supplied from the selector 11 via its input line (which is connected to the selector 11) corresponding to the line number of the input line (which is connected to the ATM cell generation section 22), and outputs the ATM cell sequence to one of the output ATM lines 27 that corresponds to the line number. In the case where the multiplexing section 25 received an idle ATM cell from the ATM cell generation section 22, the multiplexing section 25 abandons the idle ATM cell. If there is no ATM cell to be outputted to one of the output ATM lines 27 on ATM cell output timing, the multiplexing section 25 outputs an idle ATM cell to the output ATM lines 27.

[Control Section 26]

Next, the operation of the control section 26 will be described in detail. The control section 26 is provided with the aforementioned path setting table which is shown in FIG. 5. The path setting table is supplied with path setting information from outside (a computer etc. for inputting the path setting information to the path setting table) and stores the path setting information. Referring to FIG. 5, the path setting information stored in the path setting table includes the channel flag, the internal address #1 (jadl), the input line number information (xa), the input VPI information (xb), the input VCI information (xc), the input CID information (xj), the internal address #2 (iad2), the output line number information (ya), the output VPI information (yb), the output VCI information (yc), the output CID information (yj), and the output ATM cell header information.

In the path setting information, an internal address #1 (iad1) is assigned to a combination of input line number information (xa), input VPI information (xb) and input VCI information (xc). The internal address #1 (iad1) is composed of, for example, 8-bit data. The input line number information (xa) is composed of 3-bit data. The input VPI information (xb) is composed of 8-bit data (or 12-bit data). The input VCI information (xc) is composed of 16-bit data. Therefore, the internal addresses #1 (iad1) (8 bits, for example) are assigned to selected possible combinations of the information (xa, xb and xc).

In the same way, an internal address #2 (iad2) is assigned to a combination of output line number information (ya), output VPI information (yb) and the output VCI information (yc). The output line number information (ya) is composed of 3-bit data. The output VPI information (yb) is composed of 8-bit data (or 12-bit data). The output VCI information (yc) is composed of 16-bit data. Therefore, the internal addresses #2 (iad2) (8 bits, for example) are assigned to selected possible combinations of the information (ya, yb and yc).

The control section 26 sets and utilizes the path setting table as follows. When the control section 26 received a channel flag, an internal address #1 (iad1), input line number information (xa), input VPI information (xb), input VCI information (xc), input CID information (xj), an internal address #2 (iad2), output line number information (ya), output VPI information (yb), output VCI information (yc), output CID information (yj), payload type information (PT) and cell loss priority information (CLP) from outside (a computer etc.), the control section 26 generates HEC information of an ATM cell referring to the output VPI information (yb), the output VCI information (yc), the payload type information (PT) and the cell loss priority information (CLP), and thereby generates output ATM cell header information. Subsequently, the control section 26 sets the channel flag, the internal address #1 (iad1), the input line number information (xa), the input VPI information (xb), the input VCI information (xc), the input CID information (xj), the internal address #2 (iad2), the output line number information (ya), the output VPI information (yb), the output VCI information (yc), the output CID information (yj), and the output ATM cell header information in the path setting table.

The correspondence between the above values for setting the path setting table is determined by operators, by a computer and software, etc. For example, it is also possible to let such a computer control (determine) the values for a plurality of AAL2 packet exchange devices at a plurality of ATM switches consistently.

When the control section 26 received input line number information (xa), input VPI information (xb) and input VCI information (xc) from the selector 11, the control section 26 refers to the path setting table based on the information (xa, xb and xc) and thereby extracts an internal address #1 (iad1) and a channel flag corresponding to the information (xa, xb and xc) from the path setting table. Subsequently, the control section 26 sends the internal address #1 (iad1) and the channel flag to the selector 11.

When the control section 26 received an internal address #1 (iad1) and input CID information (xj) from the CPS packet processing section 17, the control section 26 refers to the path setting table based on the information (iad1 and xj) and thereby extracts an internal address #2 (iad2) and output CID information (yj) corresponding to the information (iad1 and xj) from the path setting table. Subsequently, the control section 26 sends the internal address #2 (iad2) and the CID information (yj) to the CPS packet processing section 17.

When the control section 26 received an internal address #2 (iad2) from the ATM cell generation section 22, the control section 26 refers to the path setting table based on the internal address #2 (iad2) and thereby extracts output line number information (ya) and output ATM cell header information from the path setting table. Subsequently, the control section 26 sends the output line number information (ya) and the output ATM cell header information to the ATM cell generation section 22.

Meanwhile, the control section 26 outputs the aforementioned CPS-PDU output request signal and an internal address #2 (iad2) to the CPS-PDU generation section 20 in case where a timer corresponding to the internal address #2 (iad2) counted to a predetermined period. The timer is reset (cleared) when the control section 26 received the CPS-PDU output information signal and the internal address #2 (iad2) from the CPS-PDU generation section 20.

Referring again to the path setting table of FIG. 5, four cases corresponding to internal addresses #1 (iad1)=0, 1, 3 and 7 are typically showing the CID alteration which is executed by the CPS packet processing section 17. CPS packets corresponding to the internal addresses #1 (iad1)=0, 1, 3 and 7 are filled in ATM cells whose VPIs and VCIs are "12" and "20" to be outputted to an output ATM line No.1, by the CPS-PDU generation section 20 and the ATM cell generation section 22. The input CIDs (xj) of the four CPS packets supplied from different input ATM lines (No.1, 5, 1 and 7) or different sources are the same (20). However, the CID information (xj=20) of a CPS packet header which has been contained in an ATM cell corresponding to the internal address #1 (iad1)=1 is altered to the output CID information (yj=21), and CID information (xj=20) of a CPS packet header which has been contained in an ATM cell corresponding to the internal address #1 (iad1)=3 is altered to the output CID information (yj=100), and CID information (xj=20) of a CPS packet header which has been contained in an ATM cell corresponding to the internal address #1 (iad1)=7 is altered to the output CID information (yj=25), as shown in FIG. 5, and thereby CID collision between CPS packets supplied from different sources is prevented.

As described above, the AAL2 packet exchange device according to the embodiment of the present invention which is placed in front of an ATM switch extracts CPS packets from ATM cells which are supplied from the input ATM lines 10, alters CID information in the CPS packets if necessary, re-multiplexes the CPS packets in ATM cells depending on output ATM connections, and thereby prevents CID collision in an ATM connection between CPS packets which have been supplied from different sources.

By the CID alteration, CPS packets which have been contained in ATM cells from different sources can be multiplexed onto the same VP/VC. Therefore, multiplexing efficiency on each ATM connection can be improved, thereby increase in the number of ATM cells can be avoided, and thus the load on ATM switches can be lightened.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An AAL2 packet exchange device which is placed in front of an ATM switch for executing CPS packet re-multiplexing into ATM cells, wherein the AAL2 packet exchange device extracts CPS-PDUs (Common Part Sublayer-Protocol Data Units) from ATM cells which are supplied from input ATM lines, extracts CPS packets from the CPS-PDUs, alters CIDs (Channel IDentifiers) of the CPS packets if necessary so that CID collision will not occur between CPS packets supplied from different sources to be outputted to the same output ATM connection, multiplexes the CPS packets to be outputted to the same output ATM connection in ATM cells of the same output ATM connection, and thereby realizes re-multiplexing of CPS packets extracted from ATM cells supplied from different sources into the same ATM connection without the CID collision, said AAL2 packet exchange device comprising:

a selector means for selecting ATM cells containing CPS-PDUs and ATM cells not containing CPS-PDUs from ATM cells supplied from the input ATM lines, outputting the ATM cells not containing CPS-PDUs untouched, and extracting the CPS-PDUs from the ATM cells containing CPS-PDUs;

a path setting table means for storing a table indicating each correspondence between a first internal address for discriminating between input ATM connections, an input CID, a second internal address for discriminating between output ATM connections, and an output CID;

a first memory means for storing the CPS-PDUs extracted by the selector means and the first internal addresses concerning the CPS-PDUs;

a CPS-PDU processing means for extracting CPS packets from the CPS-PDU which has been stored in the first memory means, storing the front part of a CPS packet if the CPS packet has been split across two CPS-PDUs, and regenerating the CPS packet when the rear part of the CPS packet is supplied by adding the rear part to the front part of the CPS packet which has been stored therein;

a CPS packet processing means for obtaining the second internal address and the output CID concerning each CPS packet extracted or regenerated by the CPS-PDU processing means by referring to the path setting table means using the first internal address and the CID (input CID) concerning the CPS packet, updating the CID (input CID) of each CPS packet into the output CID, updating HEC (Header Error Control) information of the CPS packet, and outputting the CPS packet and the second internal address concerning the CPS packet;

a second memory means for storing the CPS packets and the second internal addresses concerning the CPS packets outputted by the CPS packet processing means;

a CPS-PDU generation means for reading out the CPS packets and the second internal addresses concerning the CPS packets from the second memory means, multiplexing CPS packets corresponding to the same second internal address into a CPS-PDU, and outputting the CPS-PDU;

an ATM cell generation means for filling the CPS-PDU supplied from the CPS-PDU generation means in an ATM cell and outputting the ATM cell to one of its output lines according to information obtained from the path setting table means, and meanwhile outputting an idle ATM cell to each output line that has no ATM cell to be outputted thereto; and a multiplexing means for multiplexing the ATM cells not containing CPS-PDUs outputted by the selector means and the ATM cells outputted by the ATM cell generation means, and outputting the multiplexed ATM cells to its output lines.

2. An AAL2 packet exchange device as claimed in claim 1, further comprising a CPS-PDU output request means for sending a CPS-PDU output request signal and a second internal address to the CPS-PDU generation means if the CPS-PDU generation means has not outputted a CPS-PDU corresponding to the second internal address for a predetermined period, and thereby making the CPS-PDU generation means output a CPS-PDU corresponding to the second internal address to the ATM cell generation means immediately.

3. An AAL2 packet exchange device as claimed in claim 1, wherein the first memory means includes:

a CPS-PDU FIFO (First In First Out) memory for storing the CPS-PDUs supplied from the selector means according to FIFO operation; and a first internal address FIFO memory for storing the first internal addresses concerning the CPS-PDUs according to FIFO operation.

4. An AAL2 packet exchange device as claimed in claim 1, wherein the second memory means includes:

a CPS packet FIFO (First In First Out) memory for storing the CPS packets outputted by the CPS packet processing means; and a second internal address FIFO memory for storing the second internal addresses concerning the CPS packets according to FIFO operation.

5. An AAL2 packet exchange device as claimed in claim 1, wherein the CPS-PDU processing means includes a CPS packet front part memory for storing the front part of the CPS packet which has been split across two CPS-PDUs with respect to each first internal address.

6. An AAL2 packet exchange device as claimed in claim 1, wherein the CPS-PDU generation means includes a CPS-PDU front part memory for storing the CPS-PDU in the middle of generation with respect to each second internal address.

7. An AAL2 packet exchange device as claimed in claim 1, wherein the selector means includes:

internal buffers each of which is provided corresponding to each of the input ATM lines for storing the ATM cell supplied from the input ATM line;

buffer control sections for controlling reading/writing of the ATM cells to the internal buffers;

a selector section for executing ATM cell transmission request to each buffer control section, receiving the ATM cell from the buffer control section, extracting the VPI (Virtual Path Identifier) and the VCI (Virtual Channel Identifier) from the ATM cell, obtaining the first internal address concerning the ATM cell from the path setting table means using the VPI, the VCI and the input line number concerning the ATM cell, sending the ATM cell and the first internal address concerning the ATM cell to a CPS-PDU transmission section if the ATM cell contains a CPS-PDU, and sending the ATM cell and the input line number concerning the ATM cell to an ATM cell transmission section if the ATM cell does not contain a CPS-PDU;

the CPS-PDU transmission section for receiving the ATM cell containing the CPS-PDU and the first internal address from the selector section, extracting the CPS-PDU from the ATM cell, and outputting the CPS-PDU and the first internal address to the first memory means; and the ATM cell transmission section for receiving the ATM cell not containing a CPS-PDU and the input line number concerning the ATM cell from the selector section, and outputting the ATM cell to the multiplexing means via one of its output lines corresponding to the input line number.

8. An AAL2 packet exchange device as claimed in claim 1, wherein the CPS-PDU processing means includes:

a CPS packet front part memory for storing the front part of a CPS packet which has been split across two CPS-PDUs with respect to each first internal address;

a CPS-PDU reception section for reading out the CPS-PDU and the first internal address concerning the CPS-PDU from the first memory means, extracting a CPS-PDU header and CPS-PDU payload information from the CPS-PDU, outputting the CPS-PDU header and the first internal address to a CPS packet extraction/regeneration section, and writing the CPS-PDU payload information in a CPS-PDU payload buffer;

the CPS-PDU payload buffer for storing the CPS-PDU payload information; and the CPS packet extraction/regeneration section for executing a CPS packet extraction/regeneration process with regard to the CPS-PDU using the CPS-PDU payload information stored in the CPS-PDU payload buffer, the CPS-PDU header and the first internal address supplied from the CPS-PDU reception section, and the front part of a CPS packet which has been stored in the CPS packet front part memory, and outputting the extracted/regenerated CPS packets, the first internal address concerning the CPS packets, and the CIDs of the CPS packets to the CPS packet processing means.

9. An AAL2 packet exchange device as claimed in claim 1, wherein the CPS-PDU generation means includes:

a CPS packet reception section for reading out the CPS packet and the second internal address concerning the CPS packet from the second memory means and outputting them when a CPS packet request signal is supplied thereto;

a CPS-PDU front part memory for storing a CPS-PDU in the middle of generation with respect to each second internal address; and a CPS-PDU transmission section for sending the CPS packet request signal to the CPS packet reception section when there is data in the second memory means, receiving the CPS packet and the second internal address concerning the CPS packet from the CPS packet reception section, reading out the CPS-PDU in the middle of generation with respect to the second internal address from the CPS-PDU front part memory, adding the CPS packet to the CPS-PDU in the middle of generation with respect to the second internal address, sending a completed CPS-PDU and the second internal address concerning the CPS-PDU when a CPS-PDU is completed, and writing a CPS-PDU in the middle of generation in the CPS-PDU front part memory.

* * * * *